(12) United States Patent
Chentanez et al.

(10) Patent No.: US 10,055,875 B2
(45) Date of Patent: Aug. 21, 2018

(54) REAL-TIME EULERIAN WATER SIMULATION USING A RESTRICTED TALL CELL GRID

(75) Inventors: Nuttapong Chentanez, Bangkok (TH); Matthias Müller-Fischer, Stäfa (CH)

(73) Assignee: NVIDIA CORPORATION, Santa Clara, CA (US)

(*) Notice: Subject to any disclaimer, the term of this patent is extended or adjusted under 35 U.S.C. 154(b) by 780 days.

(21) Appl. No.: 13/555,017

(22) Filed: Jul. 20, 2012

(65) Prior Publication Data

US 2013/0035917 A1    Feb. 7, 2013

Related U.S. Application Data

(60) Provisional application No. 61/515,286, filed on Aug. 4, 2011.

(51) Int. Cl.
| | | |
|---|---|---|
| *G06T 13/60* | (2011.01) | |
| *G06T 17/20* | (2006.01) | |
| *G06T 13/80* | (2011.01) | |
| *G06T 17/00* | (2006.01) | |
| *G06T 1/60* | (2006.01) | |
| *G06T 13/20* | (2011.01) | |

(52) U.S. Cl.
CPC ............ *G06T 13/60* (2013.01); *G06T 17/20* (2013.01); *A63F 2300/663* (2013.01); *G06T 1/60* (2013.01); *G06T 13/20* (2013.01); *G06T 13/80* (2013.01); *G06T 17/00* (2013.01); *G06T 2210/24* (2013.01)

(58) Field of Classification Search
None
See application file for complete search history.

(56) References Cited

U.S. PATENT DOCUMENTS

| | | | |
|---|---|---|---|
| 5,537,641 A * | 7/1996 | da Vitoria Lobo et al. | 345/419 |
| 5,877,777 A * | 3/1999 | Colwell | 345/473 |
| 6,342,886 B1 * | 1/2002 | Pfister | G06T 13/20 345/419 |

(Continued)

FOREIGN PATENT DOCUMENTS

EP    2083392 A2    7/2009

OTHER PUBLICATIONS

G. Irving, E. Guendelman, F. Losasso, R. Fedkiw, "Efficient Simulation of Large Bodies of Water by Coupling Two and Three Dimensional Techniques" pp. 1-7, 2006.*

(Continued)

Primary Examiner — Kibrom K Gebresilassie
(74) Attorney, Agent, or Firm — Artegis Law Group, LLP

(57) ABSTRACT

One embodiment of the present invention sets forth an Eulerian fluid simulation technique which enables real-time simulations of large scale three dimensional fluid volumes that include free surface water. A hybrid grid representation composed of regular cubic cells on top of a layer of tall cells is used to reduce computation time. Water above an arbitrary terrain can be represented without consuming an excessive amount of memory and compute power, while focusing simulation effort on the area near the surface of the water to produce accurate results. Additionally, the grid representation may be optimized for a graphics processor implementation of the fluid solver.

21 Claims, 13 Drawing Sheets

(56) References Cited

U.S. PATENT DOCUMENTS

| | | | | |
|---|---|---|---|---|
| 7,948,485 | B1* | 5/2011 | Larsen | G06T 13/60 345/419 |
| 8,041,550 | B1* | 10/2011 | Thuerey et al. | 703/9 |
| 8,204,725 | B1* | 6/2012 | Thuerey et al. | 703/9 |
| 8,364,865 | B2* | 1/2013 | Fleegal | G09G 5/39 345/418 |
| 8,878,856 | B1* | 11/2014 | Chentanez et al. | 345/473 |
| 8,970,592 | B1* | 3/2015 | Petterson | G06T 13/60 345/419 |
| 9,087,411 | B2* | 7/2015 | Chentanez | G06T 13/60 |
| 9,940,689 | B2* | 4/2018 | Dunn | G06T 1/60 |
| 2003/0060988 | A1* | 3/2003 | Ginzburg | 702/50 |
| 2008/0177519 | A1* | 7/2008 | Miller et al. | 703/9 |
| 2010/0045669 | A1* | 2/2010 | Johnson | G06T 13/60 345/420 |
| 2012/0253768 | A1* | 10/2012 | Yoon et al. | 703/9 |
| 2012/0330628 | A1* | 12/2012 | McDaniel et al. | 703/2 |
| 2013/0035918 | A1* | 2/2013 | Chentanez | G06F 17/5009 703/9 |
| 2014/0149091 | A1* | 5/2014 | Choi | G06F 17/5018 703/2 |
| 2017/0140569 | A1* | 5/2017 | Dunn | G06T 15/08 |

OTHER PUBLICATIONS

G. Irving, E. Guendelman, F. Losasso, R. Fedkiw, "Efficient Simulation of Large Bodies of Water by Coupling Two and Three Dimensional Techniques" pp. 1-7 2006.*

G. Irving, G. Guendelman, F.Losasso, R. Fedkiw, "Efficient Simulation of Large Bodies of Water by Coupling Two and Three Dimensional Techniques" pp. 1-7, 2006.*

Chentanez, N. [et al.]: Real-Time Eulerian Water Simulation Using a Restricted Tall Cell Grid. ACM Transactions on Graphics, vol. 30, Article 82, p. 82:1 to 82:10, published on Jul. 25, 2011.

O'Brien et al.—"Dynamic Simulation of Splashing Fluids," from the proceedings of Computer Animation, 1995, pp. 198-205.

United Kingdom Combined Search and Examination Report dated Nov. 30, 2012, Application No. GB1213354.2.

* cited by examiner ured from simulation of a full three-dimensional model, such as splashes and overturning waves are lost because the two-and-a-half dimensional representation cannot capture details of the water movement.
REAL-TIME EULERIAN WATER SIMULATION USING A RESTRICTED TALL CELL GRID

CROSS-REFERENCE TO RELATED APPLICATIONS

This application claims benefit of U.S. provisional patent application Ser. No. 61/515,286 filed Aug. 4, 2011, and titled "REAL-TIME EULERIAN WATER SIMULATION USING A RESTRICTED TALL CELL GRID." The subject material of this related application is hereby incorporated herein by reference.

FIELD OF THE INVENTION

The present invention generally relates to free surface water simulation and more specifically to real-time Eulerian free surface water simulation.

DESCRIPTION OF THE RELATED ART

Grid-based (Eulerian) and particle-based (Lagrangian) simulation techniques are used to generate special effects involving fluids (liquids and gases) in feature films and commercials. Conventional techniques employed for free surface water simulations are limited to off-line computation due to the complexity of the models and the simulation performance needs. Real-time performance for free surface water simulations is desired for real-time applications such as computer game applications.

Traditionally the free surface water is modeled using three-dimensions to capture details of the water movement. The number of dimensions of the models may be reduced from three to two-and-a half dimensions to reduce the complexity of the models and increase computation speed for real-time simulation. However, interesting features produced from simulation of a full three-dimensional model, such as splashes and overturning waves are lost because the two-and-a-half dimensional representation cannot capture details of the water movement.

In order to satisfy the needs of computer game applications, the details of the water movement must be retained and real-time simulation performance is needed to allow for user interaction.

Accordingly, what is needed in the art is an approach that reduces the complexity of a water model to enable real-time free surface water simulation while also producing detailed water movement.

SUMMARY OF THE INVENTION

One embodiment of the present invention sets forth a system and method for modeling free surface water. The method includes representing a three-dimensional model of a fluid volume as a two-dimensional grid of columns, where each column within the two-dimensional grid comprises a single tall cell and a constant number of regular cubic cells. One or more velocities of a fluid velocity field are computed. The height of the single tall cell associated with the column is then updated based on the velocities for each column in the two-dimensional grid.

One advantage of the technique is that free surface water simulations may be performed in real-time and also produce detailed water movement. A model of the water to be simulated is simplified using a restricted tall cell grid. Eulerian simulation techniques are applied to the restricted tall cell grid model to produce simulation results that retain detailed features of the water movement. The water movement is comparable in terms of visual detail to that provided by full three-dimensional model simulation performed off-line.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
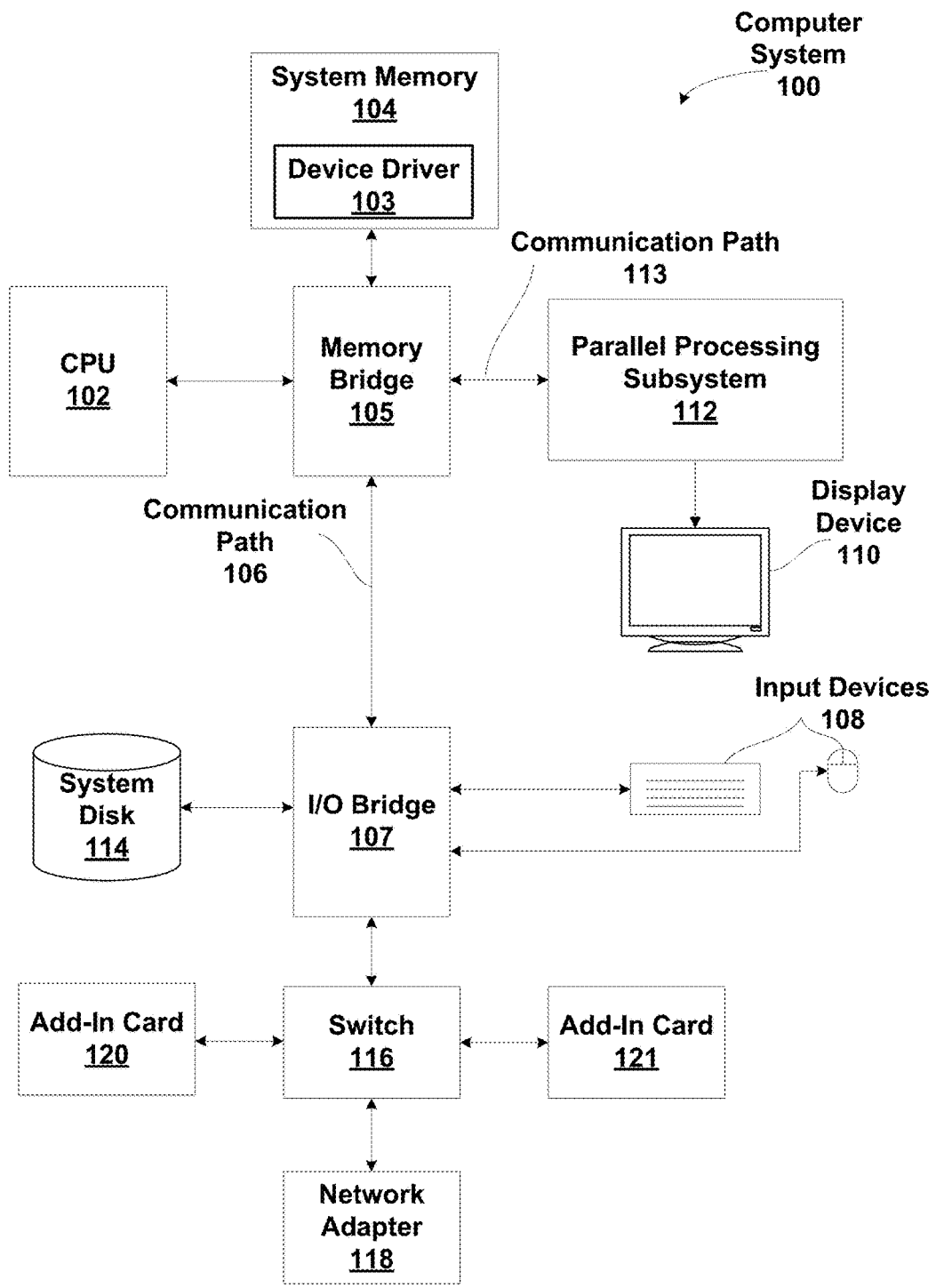
FIG. 1 is a block diagram illustrating a computer system configured to implement one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

FIG. 2A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 2A may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

FIG. 2B illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U ≧ 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 2A, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 2A or FIG. 2B) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2B, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C □ 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform patch tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in pixel space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D □ 1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2B, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 2:
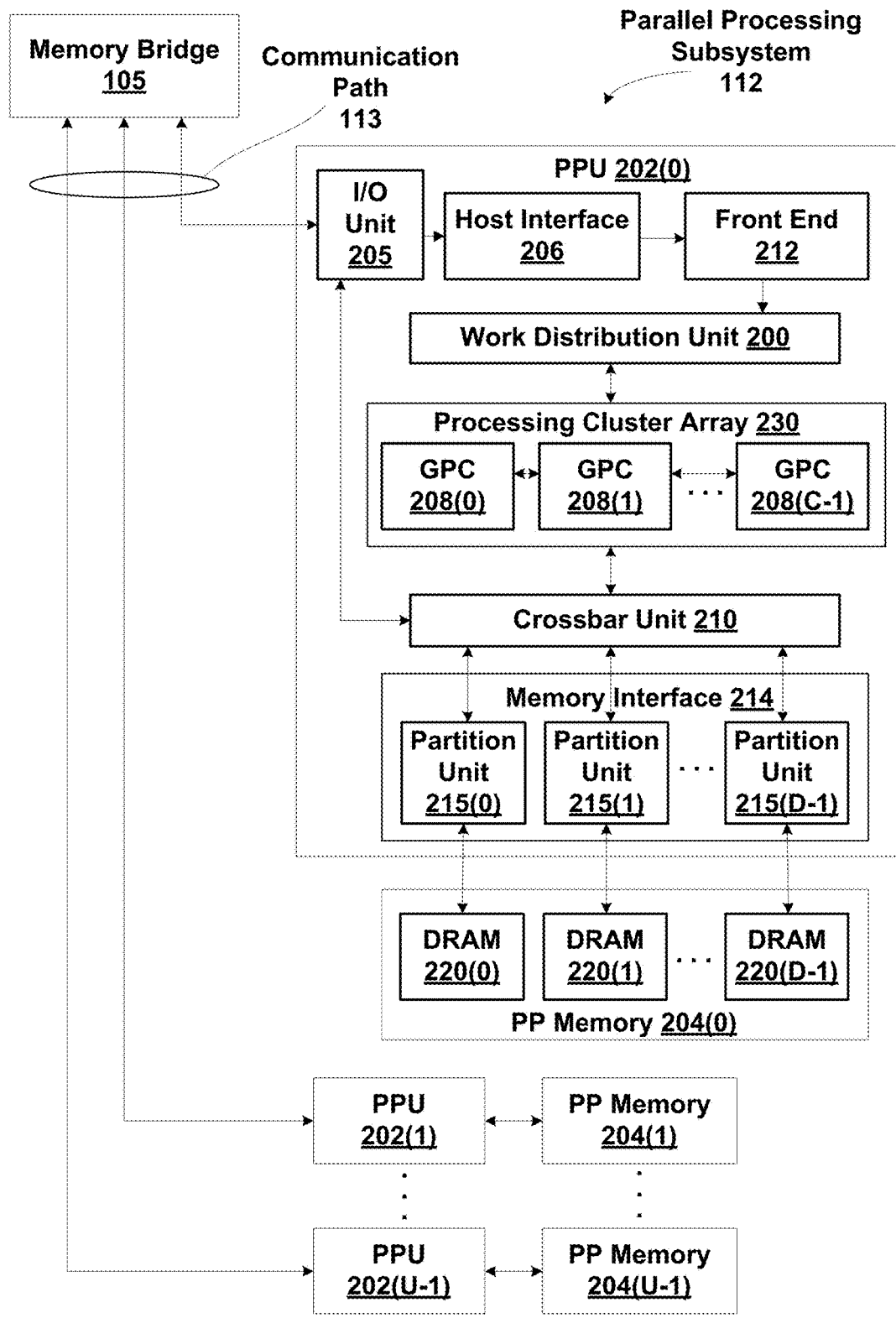
FIG. 2 is a block diagram of a parallel processing subsystem for the computer system of FIG. 1, according to one embodiment of the present invention.
Figure 3A:
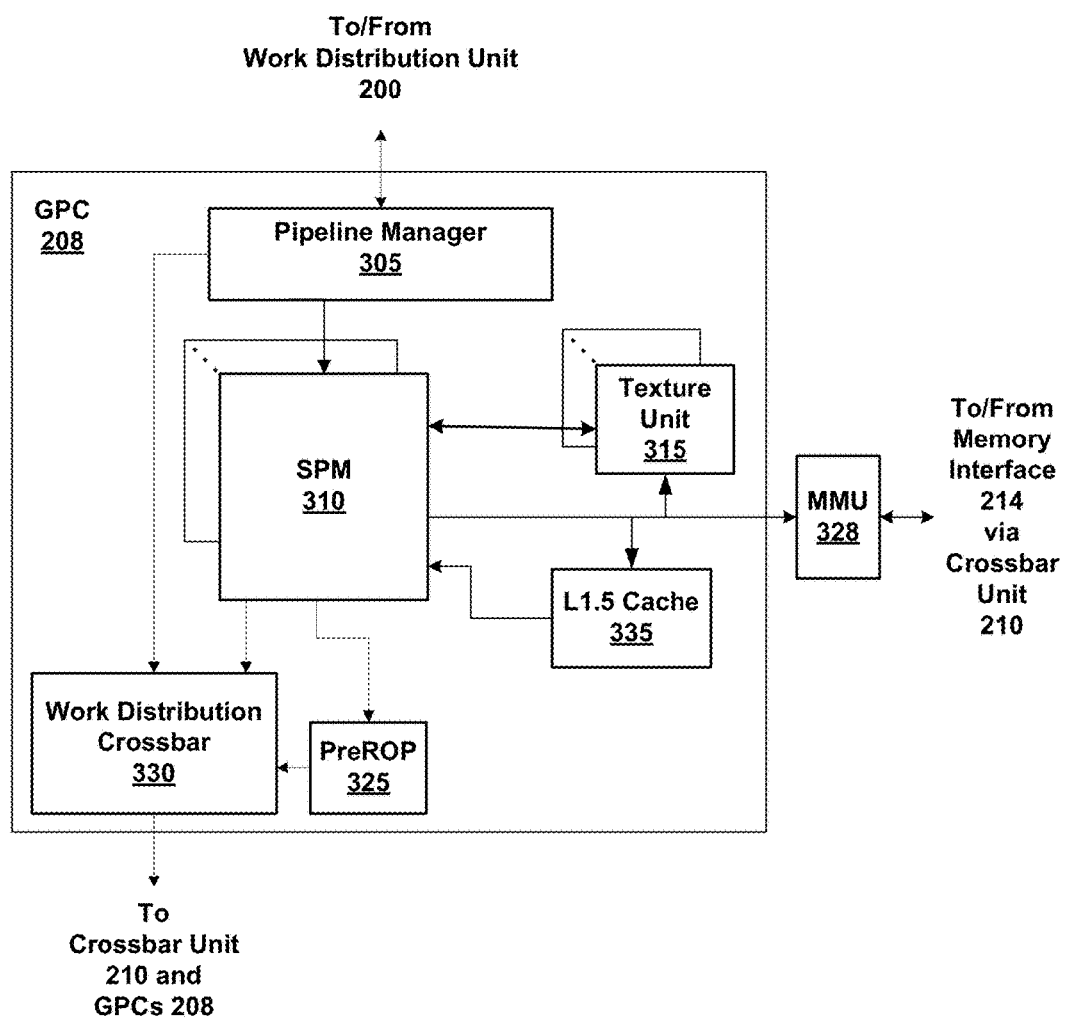
FIG. 3A is a block diagram of a GPC within one of the PPUs of FIG. 2, according to one embodiment of the present invention.

FIG. 3A is a block diagram of a GPC 208 within one of the PPUs 202 of FIG. 2B, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC

208 advantageously operates independently of other GPCs 208 using separate and distinct processing units, L1 caches, and so on.

Figure 3B:
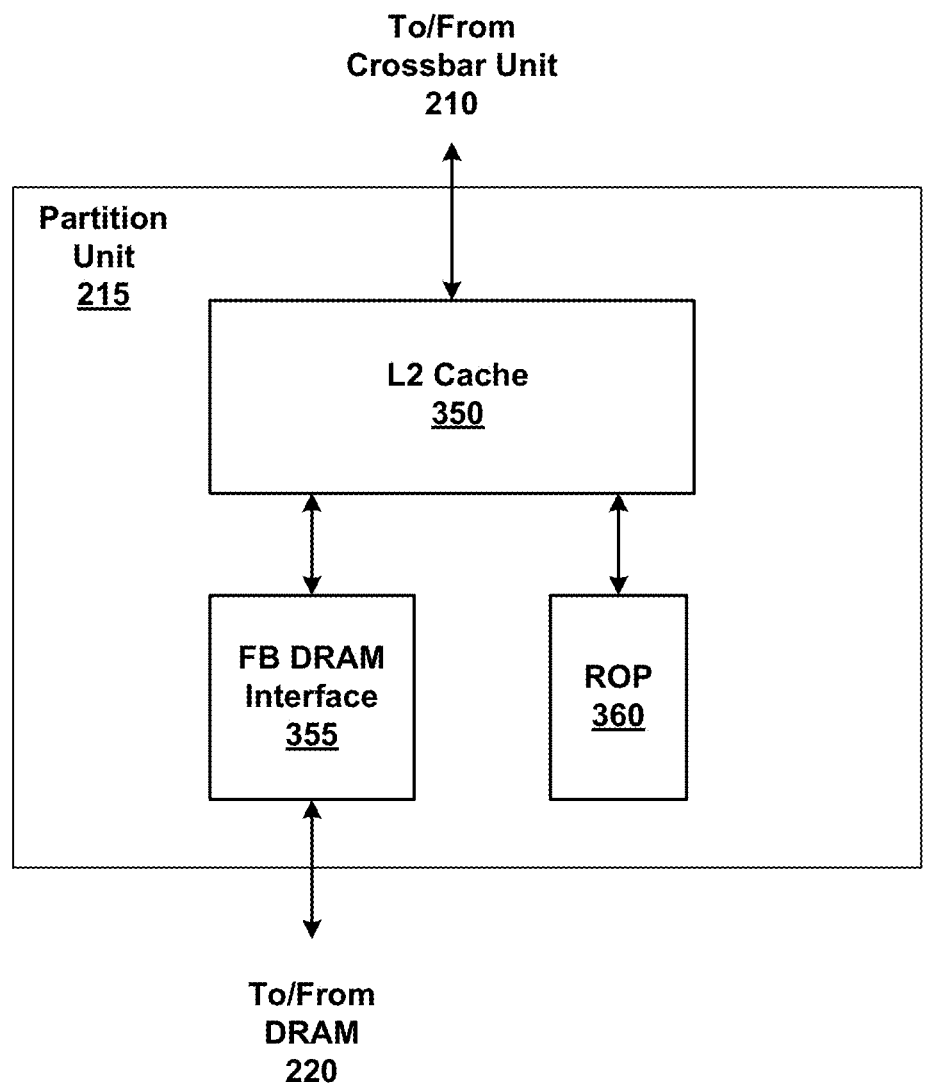
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2B, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 2A, 2B, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
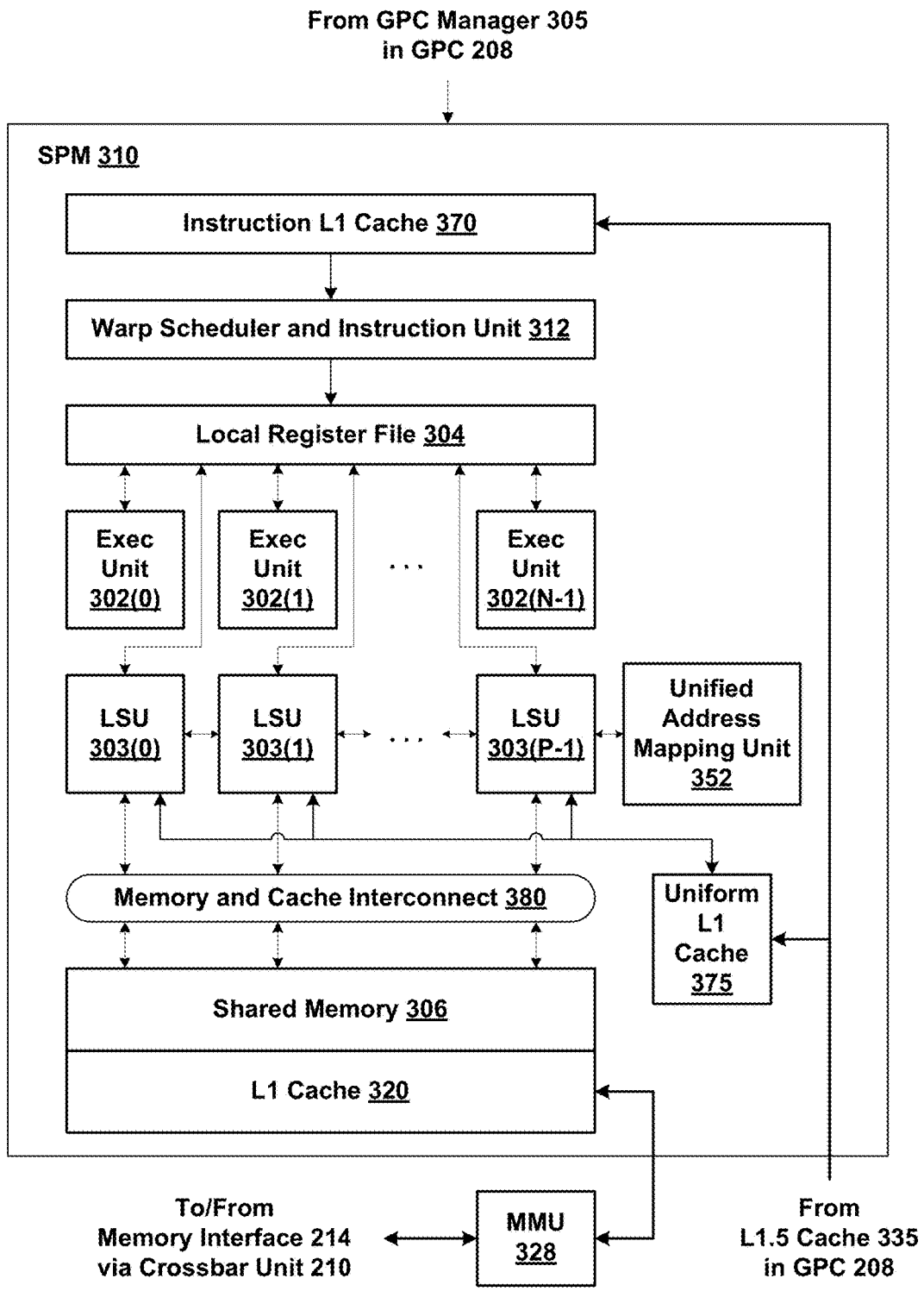
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
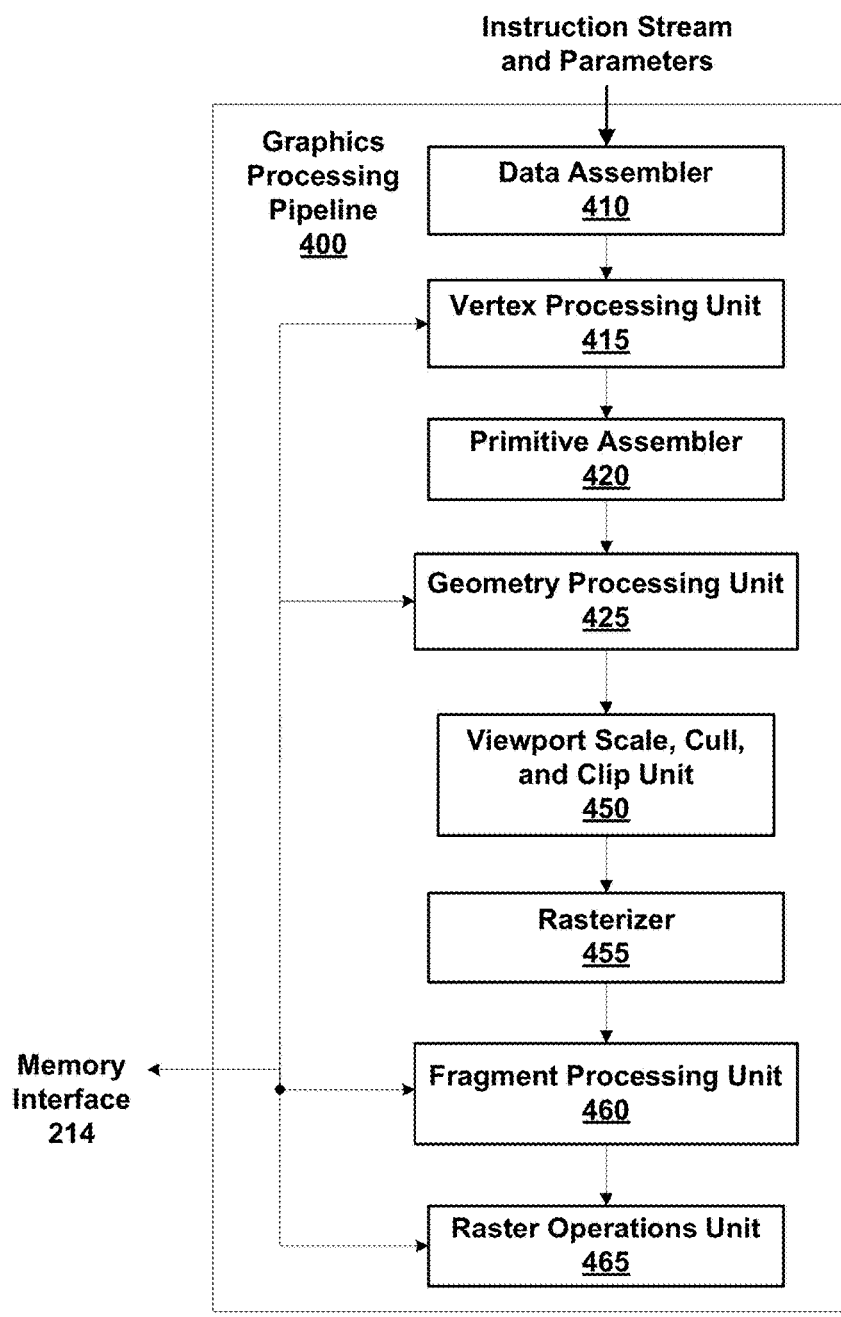
FIG. 4 is a conceptual diagram of a graphics processing pipeline that one or more of the PPUs of FIG. 2B can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Persons skilled in the art will understand that the architecture described in FIGS. 1, 2, 3A, 3B, 3C, and 4 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Real-Time Eulerian Water Simulation Using a Restricted Tall Cell Grid

A hybrid grid representation that provides a three-dimensional representation of water above an arbitrary terrain is composed of regular cubic cells on top of a layer of tall cells. A fluid solver that simultaneously solves the three-dimensional Euler equation for both the tall cells and the regular cubic cells may be efficiently executed by a GPU such as the PPU 112 or by another SIMD architecture. Parallel execution is performed to simultaneously compute values for the grid cells, e.g., tall cells and the regular cubic cells. Additionally, a specialized multigrid algorithm for solving the Poisson equation may be used to accelerate simulations. The hybrid grid representation and computational optimizations allow for real-time simulation performance while maintaining the complexity of the fluid movement.

Figure 5A:
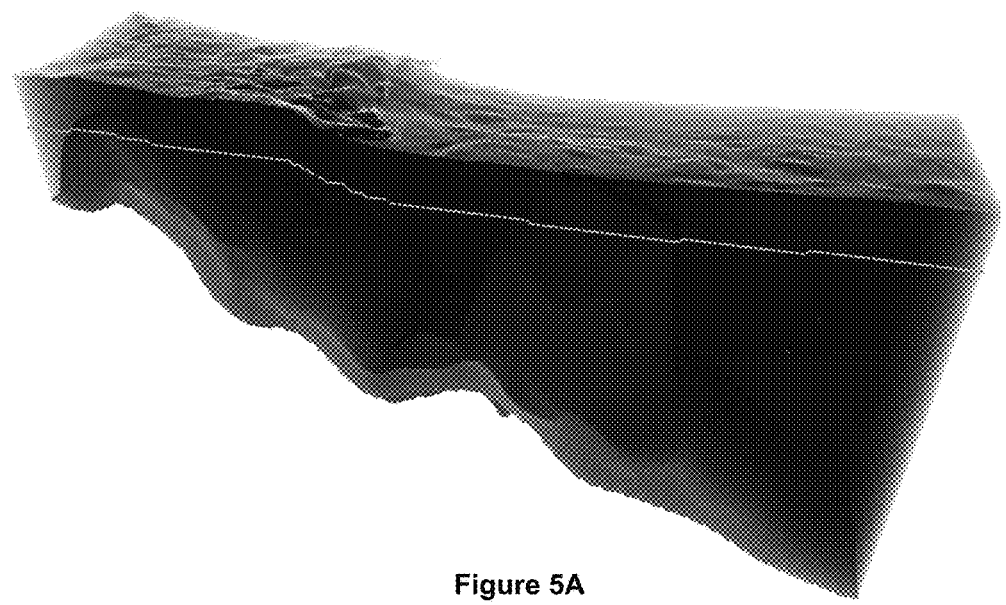
FIGS. 5A, 5B, and 5C are images produced by simulation of a restricted tall cell grid model of free surface water, according to one embodiment of the present invention.
Figure 5B:
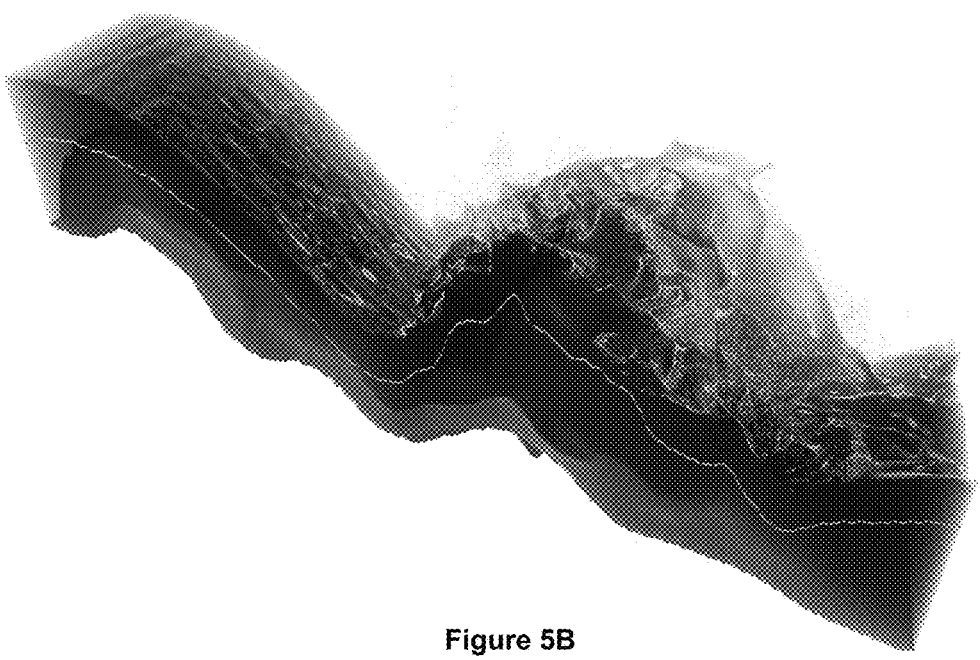
Figure 5C:
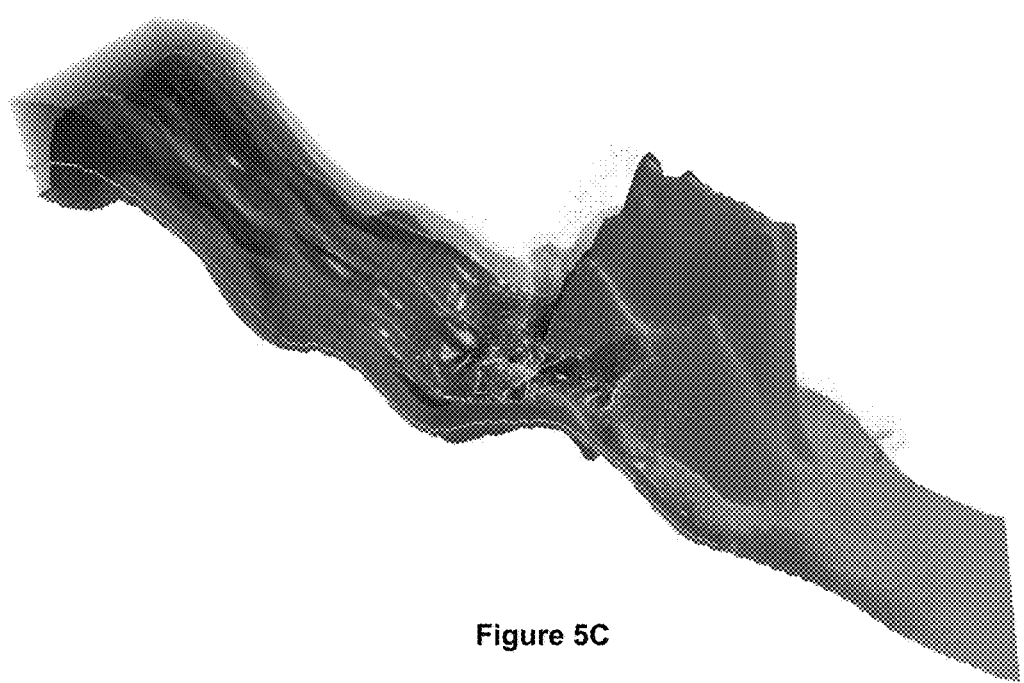

FIGS. 5A, 5B, and 5C are images produced by simulation of a restricted tall cell grid model of free surface water, according to one embodiment of the present invention. Water flows from left to right into an uneven terrain. The model is represented by tall cells that represent a major portion of the water volume. The computations are focused on the surface area that is represented by regular cubic cells stacked on top of the tall cells.

Fluids are simulated by solving the inviscid Euler Equations, $$\frac{\partial u}{\partial t} = -(u \cdot \nabla)u + \frac{f}{\rho} - \frac{\nabla p}{\rho} \qquad \text{equation (1)}$$

subject to the incompressibility constraint $$\nabla \cdot u = 0, \qquad \text{equation (2)}$$

where $u=[u, v, w]^T$ is the fluid velocity field, p is the pressure, t is time, $\rho$ is the fluid density and f is a field of external forces. The equations are solved in the domain specified by a scalar level-set field $\varphi$ in the region where $\varphi < 0$. $\varphi$ itself is evolved by $$\frac{\partial \varphi}{\partial t} = -u \cdot \nabla \varphi \qquad \text{equation (3)}$$

Figure 5D:
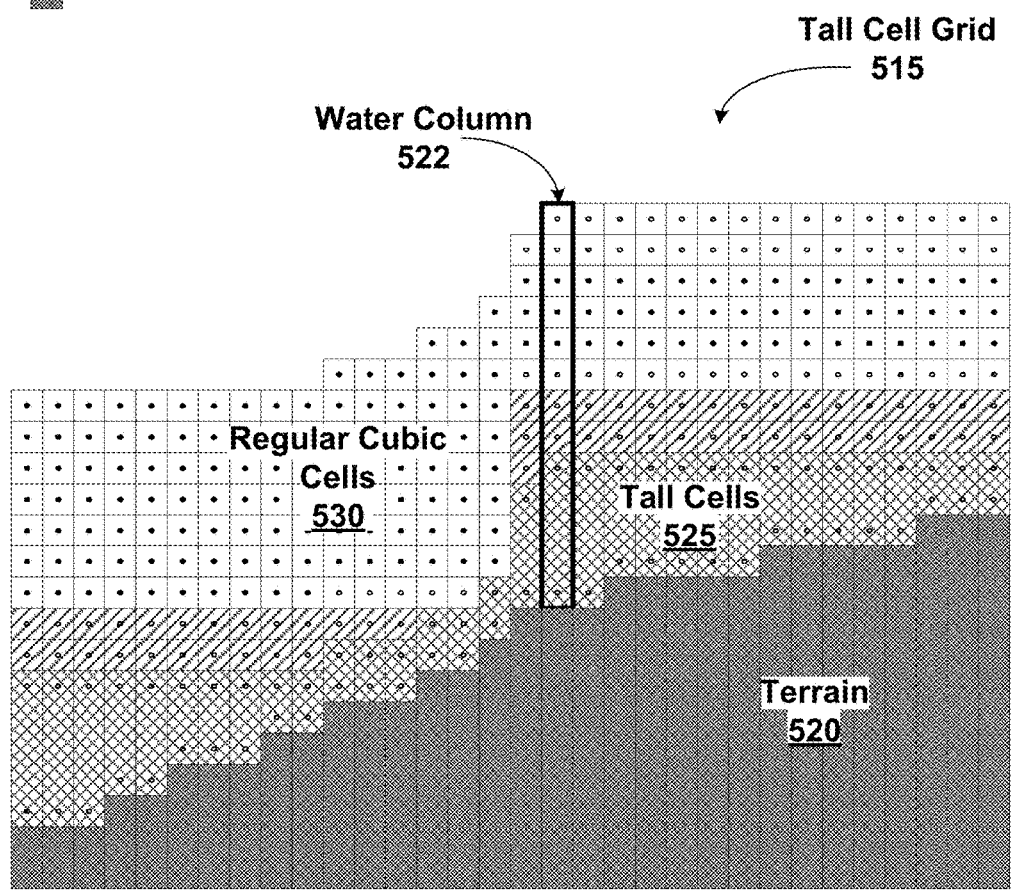
FIG. 5D is a cross sections of the tall cell grid model, according to one embodiment of the present invention.

As a discretization of the simulation domain a specialized tall cell grid is used to model the fluid volume that includes the water and air above the water. FIG. 5D is a cross section of the hybrid grid model comprised of tall cells 525 and regular cubic cells 530, according to one embodiment of the present invention. Each water column is positioned on the terrain 520 and includes a single tall cell and a constant number of regular cubic cells. For example, a water column 522 includes a single tall cell representing water, two regular cubic cells representing water, and six regular cubic cells representing air above the water. As shown in FIG. 5D, the constant number of regular cubic cells in each water column is eight.

The terrain height and the height of the tall cell are discretized to be a multiple of the grid spacing $\Delta x$. The height values are stored in two arrays. For regular cubic cells, all the physical quantities such as velocity, level set value and pressure are stored at the center of the regular cubic cell. For tall cells, values of physical quantities are stored at the center of the topmost and the bottommost subcells, where a size of each subcell matches a regular cubic cell. In contrast, conventional techniques require storing a number of parameters equal to the number of regular cubic cells represented by each tall cell. In terms of implementation, a quantity q is stored in a compressed 3D array, $q_{i,j,k}$ of size $(B_x, B_y+2, B_z)$ where $B_x$ and $B_z$ are the number of cells along the x and z axis respectively, $B_y$ is the constant number of regular cells along the y-axis per column and the +2 comes from the top and the bottom values stored in per tall cell. In addition, the terrain height $H_{i,k}$ and the tall cell height $h_{i,k}$ are stored in two 2D arrays of size $(B_x, B_z)$. The y-coordinate of the uncompressed position of an array element $q_{i,j,k}$ is given by $$y_{i,j,k} = \begin{cases} H_{i,k} + 1 & \text{if } j = 1(\text{tall cell bottom}) \\ H_{i,k} + h_{i,k} & \text{if } j = 2(\text{tall cell top}) \\ H_{i,k} + h_{i,k} + j - 2 & \text{if } j \geq 3(\text{regular cubic cell}). \end{cases} \qquad \text{equation (4)}$$

A quantity stored in the compressed array at position i, j, k is denoted as $q_{i,j,k}$ without parentheses, and a quantity at the uncompressed world location $(x\Delta x, y\Delta x, z\Delta x)$ is denoted as $q_{(x,y,z)}$ with parentheses. Depending on the y-coordinate, there are four cases for evaluating $q_{(x,y,z)}$ based on the values stored in the compressed array.

If $y \leq H_{x,z}$ the value of $q_{(x,y,z)}$ is the value below the terrain 520.

If $H_{x,z} < y \leq H_{x,z} + h_{x,z}$ the requested quantity lies within the tall cell. In this case, the requested quantity is computed by linearly interpolating from the top and the bottom sub-cells of the tall cell:

$$q_{(x,y,z)} = \frac{y - H_{x,z}}{h_{x,z}} q_{x,2,z} + \left(1 - \frac{y - H_{x,z}}{h_{x,z}}\right) q_{x,2,z} \qquad \text{equation (5)}$$

If $H_{x,z} + h_{x,y} < y < H_{x,z} + h_{x,z} + B_y$, the quantity is obtained by looking the value up from the regular cells in the compressed array as $$q_{(x,y,z)} = q_x(y - H_{x,z} - h_{x,z} - 2), z \qquad \text{equation (6)}$$

Otherwise $q_{(x,y,z)}$ is the value above air.

The definition of $q_{(x,y,z)}$ hides the tall cell structure of the grid. Once implemented, the grid can be accessed as if the grid is a regular grid composed of regular cubical cells only, which significantly simplifies the computations performed during a simulation. A quantity at an arbitrary point in space can be computed by trilinearly interpolating the nearest $q_{(x,y,z)}$'s.

There are a few properties that distinguish the tall cell formulation from conventional techniques that also use tall cells.

1. The tall cell grid has a constant data size for all values p, u, $\varphi$. The constant data size allows for an efficient GPU implementation for simulations. In contrast, conventional techniques store a variable number of values of p and $\varphi$ depend on the number of tall cells used per water column. Moreover, each tall cell stores a single velocity component per touching tall cell neighbor. The fact that the number of tall cells and the number of touching neighbors vary during the simulation complicates the data storage and implementation for conventional techniques that store multiple velocities for each tall cell and then store multiple corresponding velocity components for each velocity stored by a touching tall cell neighbor.

2. A collocated grid is used which reduces the number of rays that need to be traced in the semi-Lagrangian step of a simulation. Computation of the number of rays that are traced is significant, especially when the grid resolution used for surface tracking is higher than the grid resolution used for simulation.

3. In contrast to the general case, the stencil of the discrete Laplacian operator on the simplified tall cell grid includes a constant number of neighbors.

The time integration scheme that is used to perform the simulation for each timestep is summarized in TABLE 1. With the exception of the remeshing step, the time integration technique follows standard Eulerian fluid simulation.

TABLE 1

Time Integration Scheme

| | |
|---|---|
| 1: | Velocity extrapolation |
| 2: | Level set reinitialization |
| 3: | Advection and external force integration |
| 4: | Remeshing |
| 5: | Incompressibility enforcement |

First, the velocity field is extrapolated into the air region. Then, after reinitializing the level-set (signed distance) field, the level set and the velocity field are advected and external forces are taken into account. The next step is to perform remeshing by recomputing the height of the tall cells and transferring the physical quantities to update the tall cell grid. Finally, incompressibility is enforced by making the velocity field divergence free.

The x-component of the velocity field u can be extrapolated into the air region, where $\varphi>0$, by solving the equation $$\frac{\partial u}{\partial \tau} = -\frac{\nabla \phi}{|\nabla \phi|} \cdot \nabla u, \qquad \text{equation (7)}$$

where $\tau$ is fictitious time. Similar equations are used for v and w. For a CPU implementation, a conventional O(n log n) algorithm exists for solving this equation efficiently. A variation of an Eikonal solver has been proposed to solve the equation efficiently on GPUs. The CPU implementation and the variation of the Eikonal solver are efficient because they can be terminated early. Furthermore, if the time step is not too large, the velocity is only needed within a narrow band of air cells near the liquid surface.

However, for the time integration scheme shown in TABLE 1 the velocity is relatively large and the time step that is used (1/30 s) is much larger than is typically used in water simulations. Therefore, water can cross several grid cells in a single time step. To make this possible, velocity information far away from the liquid surface is needed.

Fortunately, an accurate velocity field is only needed close to the surface, while far away from the liquid a crude estimate is sufficient. Therefore, a variation of an Eikonal solver algorithm is applied only in a narrow band of two cells at the surface. Outside of the narrow band region, a coarser level of a hierarchical tall cell grid maybe used for extrapolating the velocity field. All velocity components can be simultaneously extrapolated when a collocated grid is used.

Generating a Multigrid and a Pressure Solver for Fluid Simulation

Figure 5E:
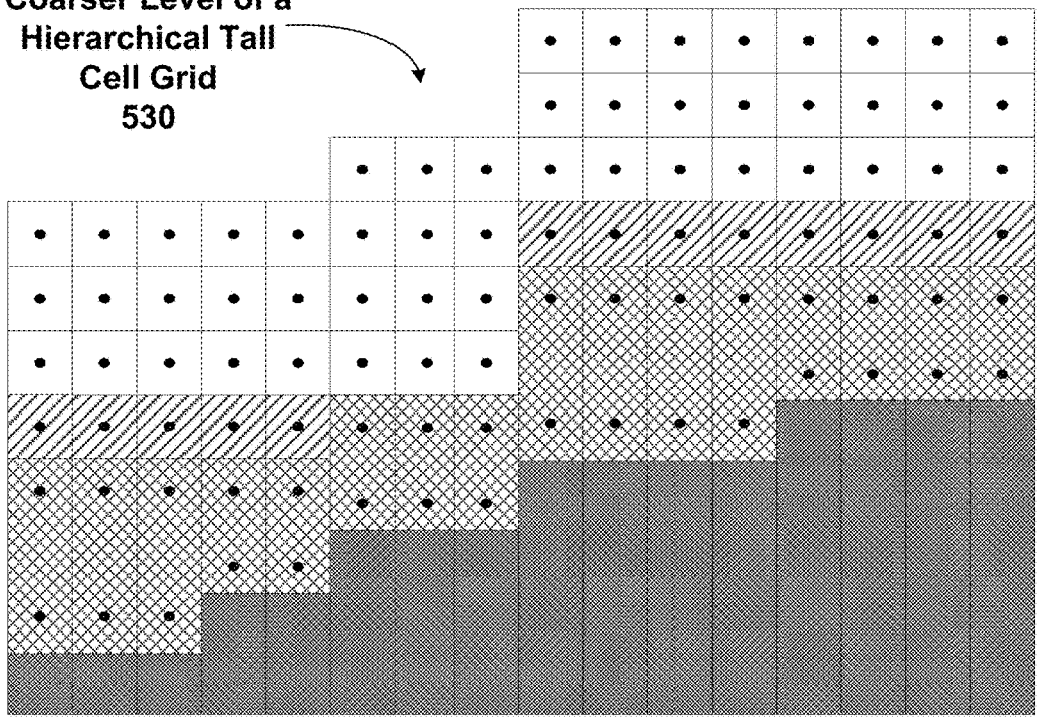
FIGS. 5E and 5F illustrate coarser hierarchical levels of the tall cell grid shown in FIG. 5D, according to one embodiment of the present invention.
Figure 5F:
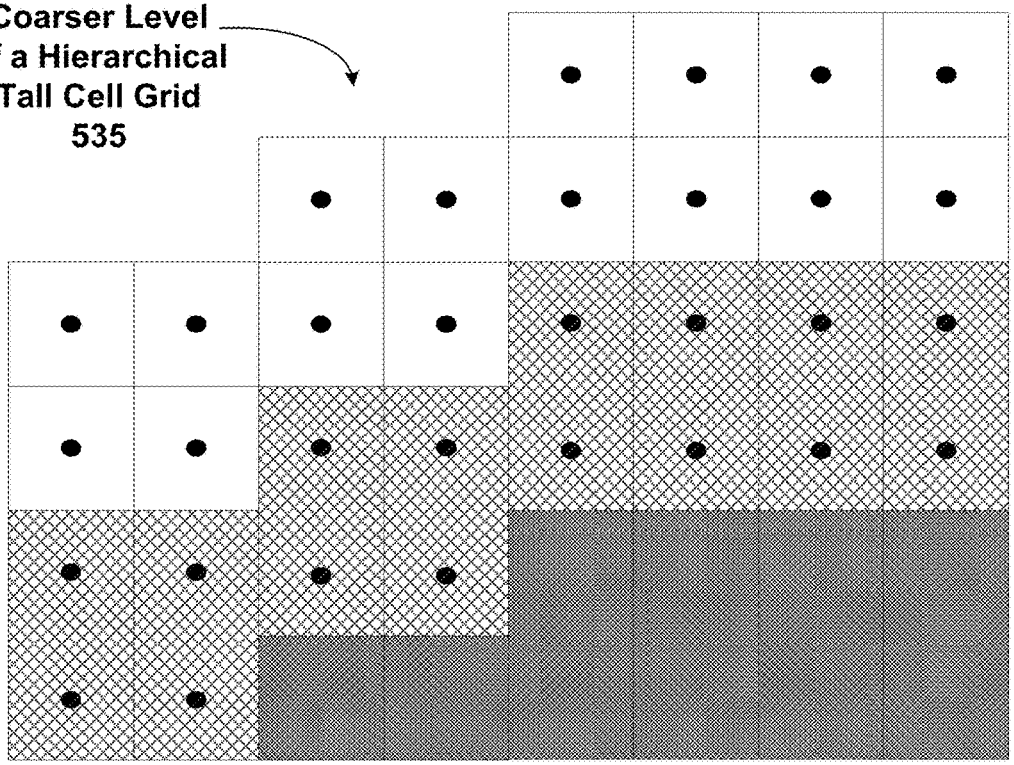

FIG. 5E is a cross section of a first coarser hierarchical level of the tall cell grid 530 that is a coarser level of the tall cell grid 515 shown in FIG. 5D, according to one embodiment of the present invention. FIG. 5F is a cross section of a second coarser hierarchical level of the tall cell grid 535 that is a coarser level of the tall cell grid 515 shown in FIG. 5D, according to one embodiment of the present invention.

The multigrid provides a hierarchy of increasingly coarser representations of the model that may be used by a pressure solver. As described further herein, Eulerian simulation techniques require solving a linear system to determine pressure values for each cell within the cell grid. Different levels of the multigrid are used to compute the pressure values for different regions of the model, maintaining accuracy while simplifying the computations. The multigrid ensures that air bubbles are correctly modeled near the surface of the water so that details of the water movement are retained. A multigrid may be generated and used to solve the linear system for a cell grid model that includes tall cells or a multigrid may be generated and used to solve the linear system for a cell grid model that includes only regular cubic cells. In other words, although the multigrid technique may be used in conjunction with the tall cell grid technique, each technique may also be employed independently for fluid simulations.

The number of levels of a hierarchical tall cell grid is determined by $L=\log_2 \min(B_x, B_y, B_z)$ where $B_x$, $B_y$, and $B_z$ are the number of regular cubic cells along the x, y, and z axes, respectively. The finest level of the hierarchical tall cell grid corresponds to the simulation tall cell grid with $\Delta x^L = \Delta x$, $u_{i,j,k}^L = u_{i,j,k}$, $H_{i,k}^L = H_{i,k}$, and $h_{i,k}^L = h_{i,k}$. On coarser levels of the hierarchical tall cell grid l, $L>l\geq 1$, the quantities $H^{l+1}$ and $h^{l+1}$ are defined via down sampling as $$H_{i,k}^l = \left\lceil \frac{\min_{i'=2i,k'=2k}^{2i+1,2k+1} H_{i',k'}^{l+1}}{2} \right\rceil \qquad \text{equation (8)}$$

$$h_{i,k}^l = \left\lceil \frac{\max_{i'=2i,k'=2k}^{2i+1,2k=1} H_{i',k'}^{l+1} + h_{i',k'}^{l+1}}{2} \right\rceil - H_{i,k}^l, \qquad \text{equation (9)}$$

Therefore, coarser levels of the hierarchical tall cell grid are tall cell grids and are guaranteed to cover all cells in the finer level of the tall cell grid hierarchy, as shown in FIGS. 5D, 5E, and 5F, where FIGS. 5E and 5F illustrate coarser hierarchical levels of the tall cell grid 515 shown in FIG. 5D.

The velocities in the hierarchy of grids are evaluated by sweeping down then sweeping up the hierarchy. On the finest level L, the velocity of a cell (tall or regular cubic) is declared to be known if the cell is a liquid cell or if the velocity is already extrapolated. Then the levels are traversed from finest to coarsest and velocities are computed by trilinearly interpolating the velocities of the previous level using only known velocities and renormalizing the interpolation weights accordingly. The velocity of a coarse cell is declared to be known if at least one corresponding finer cell velocity is known. The hierarchy of the tall cell grid is then traversed in the reverse order, from coarsest to finest, and velocities on finer levels are evaluated by trilinearly interpolating values from coarser levels of the hierarchical tall cell grid. After the two traversals are complete, every cell of the finest grid has a known velocity.

Advecting $\varphi$ destroys the signed distance field property of the scalar level set field. Therefore, $\varphi$ needs to be reinitialized periodically to be accurate at least for two to three cells away from the liquid surface. Conventional techniques may be used to reinitialize $\varphi$. Because a higher resolution level of a grid in the tall cell grid hierarchy is used for surface tracking compared with the level of the grid in the tall cell grid hierarchy that is used for the simulation, the reinitialization computation can be quite costly. In one embodiment, the reinitialization process is significantly simplified and satisfactory results are still achieved. A first simplification is to run the reinitialization step only every N frames, where N is a integer value, e.g., 10. A second simplification is to not modify φ values of grid points next to the surface during reinitialization in order to avoid moving the surface. A third simplification is to clamp the value of φ next to the liquid surface (boundary between the liquid and air) to not exceed the grid spacing Δx for every frame. Without clamping, incorrect values get advected near the liquid surface and cause surface bumpiness. To stabilize the process further, in one embodiment, all φ values are clamped to have magnitude less than 5Δx. These simplifications have not introduced significant problems or artifacts during simulations.

To advect u the modified MacCormack scheme is used and if the new velocity component lies outside the bound of the values used for interpolation simple Semi-Lagrangian advection is used. To update φ Semi-Lagrangian advection is used because the modified MacCormack scheme produces noisier surfaces, even when care is taken near the interface between the liquid and air. Because the collocated grid is used, the Semi-Lagrangian ray is traced only once for all quantities reusing the same interpolation weights. After tracing to rays, external forces such as gravity are integrated using a forward-Euler technique.

After advection, liquid cells are identified as those where φ≤0. At this point new values $h_{i,k}$ are defined, i.e. the number of cells above the terrain that should be grouped into one tall cell for each column (i, k) is determined. There are a few desirable constraints that may conflict each other:

1. There must be at least $G_L$ regular cells below the bottom-most liquid surface to capture the 3D dynamics of the liquid.
2. There must be at least $G_A$ regular cells above the top-most liquid surface, to allow water to slosh into the air during subsequent time steps.
3. The heights of adjacent tall cells must not differ by more than D units to reduce the volume gain artifacts.

First, iterate through each pair (i, k) and compute the maximum and minimum y-coordinate of the top of the tall cell that satisfy constraints (1) and (2), respectively. Next, initialize the temporary variable $y_{i,k}^{tmp}$ to be the average of the two extrema. To reduce the differences in height of adjacent tall cells several smoothing passes are run on $y_{i,k}^{tmp}$. During the smoothing $y_{i,k}^{tmp}$ is clamped so that constraints (1) and (2) are satisfied. Preference is given to constraint (2) by enforcing constraint (2) after constraint (1). Finally, iterate through (i, k) again and enforce constraint (3) in a Jacobi-type fashion using $$y_{i,k}^{tmp'} = \min\left(y_{i,k}^{tmp}, \max_{|i'-i|+|k'-k|=1} y_{i',k'}^{tmp} + D\right) \quad \text{equation (10)}$$

In one embodiment, $8 \leq G_L \leq 32$, $G_A=8, 3 \leq D \leq 6$ are used new and between one and two Jacobi iterations. Finally we set $h_{i,k}^{new} = y_{i,k}^{tmp} - H_{i,k}$. The algorithm attempts to make compromise among the constraints but may not satisfy all of them. Once the new heights of the tall cells are determined, all of the physical quantities are transferred to update the tall cell grid. For regular cubic cells, values at the corresponding locations are copied from the previous tall cell grid or are linearly interpolated if the location was occupied by a tall cell in the previous time step. For tall cells, a least square fit is performed to obtain the values at the bottom and the top of the tall cell.

Once the values are updated for the tall cell grid, incompressibility is enforced. Suppose the velocity field after the advection and the remeshing step is u*. The pressure field p is computed such that $$\nabla \cdot \left(u^* - \frac{\Delta t}{\rho} \nabla p\right) = 0 \quad \text{equation (11)}$$

Assuming a constant ρ, the Poisson equation is $$\nabla^2 p = \frac{\rho}{\Delta t} \nabla \cdot u^* \quad \text{equation (12)}$$

To discretize equation (12), the divergence, gradient and Laplacian operators are defined on the restricted tall cell grid. The following divergence operator is used:

$$(\nabla \cdot u)_{i,j,k} = \left(\frac{\partial u}{\partial x}\right) i, j, k + \left(\frac{\partial v}{\partial y}\right) i, j, k + \left(\frac{\partial w}{\partial z}\right) i, j, k, \quad \text{equation (13)}$$

Where $\quad$ equation (14)

$$\left(\frac{\partial u}{\partial x}\right)_{i,j,k} = \frac{u_{i,j,k}^+ - u_{i,j,k}^-}{\Delta x}$$

and $$u_{i,j,k}^+ = \begin{cases} \frac{u_{i,j,k} + u_{(i+1,y,k)}}{2} \\ u_{solid} \end{cases}$$

if the cell $(i+1, y, k)$ is not solid Otherwise.

$u_{i,j,k}^-$ is defined similarly and so are the terms $$\left(\frac{\partial v}{\partial y}\right) i, j, k$$

and $$\left(\frac{\partial w}{\partial z}\right) i, j, k.$$

For the Laplacian $$(\nabla^2 p)_{i,j,k} = \left(\frac{\partial^2 p}{\partial x^2}\right)_{i,j,k} + \left(\frac{\partial^2 p}{\partial y^2}\right)_{i,j,k} + \left(\frac{\partial^2 p}{\partial z^2}\right)_{i,j,k}, \quad \text{equation (15)}$$

is used, where $$\left(\frac{\partial^2 p}{\partial x^2}\right)_{i,j,k} = \frac{p_{i,j,k}^{x+} - 2p_{i,j,k} + p_{i,j,k}^{x-}}{\Delta x^2} \quad \text{equation (16)}$$

and $$p_{i,j,k}^{x+} = \begin{cases} p_{i,j,k} \frac{\varphi(i+1, y, k)}{\varphi_{i,j,k}} & \text{if the cell } (i+1, y, k) \text{ is air} \\ s_{(i+1,y,k)} p_{i,j,k} + \\ (1 - s_{(i+1,y,k)}) p_{(i+1,y,k)} & \text{otherwise} \end{cases},$$

where $s_{i,j,k}$ is the fraction of solid in a cell. $p_{i,j,k}^{x-}$ is defined similarly and so are the terms $$\left(\frac{\partial^2 p}{\partial y^2}\right)_{i,j,k}$$

and $$\left(\frac{\partial^2 p}{\partial z^2}\right)_{i,j,k}.$$

Equation (16) incorporates two important methods. First, the ghost-fluid method is used for regular cubic cells representing air to get more accurate free-surface boundary conditions by assigning negative pressures to regular cubic cells representing air such that p=0 exactly on the liquid surface, i.e., where φ=0 and not at the center of a regular cubic cell representing air. The second line of equation (16) utilizes solid fraction and is not only valid for s=0 and s=1, but for any value in between, so cells that are only partially occupied by solids can be handled correctly. The use of solid fraction is important because cells in the coarser levels of the hierarchical tall cell grid cover both solid and fluid cells of finer levels of the hierarchical tall cell grid.

Discretizing equation (12) by applying the operators defined above to all the regular cubic cells and the bottom and the top of tall cells yields a linear system for the unknown pressure field p. After solving for p, the gradient of p is computed using $$(\nabla p)_{i,j,k} = \left[\left(\frac{\partial p}{\partial x}\right)_{i,j,k} \left(\frac{\partial p}{\partial y}\right)_{i,j,k} \left(\frac{\partial p}{\partial z}\right)_{i,j,k}\right]^T, \quad \text{equation (17)}$$

where $$\left(\frac{\partial p}{\partial x}\right)_{i,j,k} = \frac{p_{i,j,k}^{x+} - p_{i,j,k}^{x-}}{\Delta x} \cdot \left(\frac{\partial p}{\partial y}\right)_{i,j,k}$$

and $$\left(\frac{\partial p}{\partial z}\right)_{i,j,k}$$

are defined similarly. The velocity can then be corrected using $$u_{i,j,k} \mathrel{-}= \frac{\Delta t}{\rho}(\nabla p)_{i,j,k} \quad \text{equation (18)}$$

Solving the linear system for p is usually the most time consuming step in fluid simulations. Without tall cells, the matrix of the system is identical to the conventional matrix appearing in standard Eulerian regular grid liquid simulation and can be solved efficiently using the incomplete Cholesky preconditioned Conjugate Gradients method. In the presence of tall cells though, the resulting linear system is non-symmetric and the Conjugate Gradients method cannot be used. On the other hand, even though non-symmetric, the system is still much simpler than the one emerging from a conventional technique that does not limit the number of velocities stored for each tall cell because a constant number of coefficients is stored per cell. The constant number of data that is stored for the tall cell grid makes the problem well suited for a data parallel architecture such as a GPU and for a hierarchical grid (multigrid) approach. TABLE 2 summarizes the algorithm for a multigrid pressure solver.

TABLE 2

Multigrid Pressure Solver

1: Compute matrix $A^L$ for level L
2: for l=L-1 down to 1 do
3:     Down sample $\varphi^{l+1} \to \varphi^l$ and $s^{l+1} \to s^l$
4:     Compute matrix $A^l$ for level l
5: end for
6: $b^L = -\Delta t/\rho(\nabla \cdot u)$ TABLE 2-continued Multigrid Pressure Solver 7: $p^L = 0$
8: for i=1 to num_Full_Cycles do
9:     Full_Cycle( )
10: end for
11: for i=1 to num_V_Cycles do
12:     V_Cycle(L)
13: end for As previously explained, at each level of the hierarchical grid, a linear system of the form $A^l p^l = b^l$ has to be solved. To down sample $s^{l+1}$ to $s^l$, an 8-to-1 average is computed for regular cubic cells and a least square fit of the 8-to-1 averages of the sub cells is performed for the tall cells. For down sampling $\varphi^{l+1}$ to $\varphi^l$ the following two cases are identified:

1. if the 8 φ-values all have the same sign or l<L-C use the 8-to-1 average,
2. otherwise use the average of the positive φ-values.

The key idea is to ensure that air bubbles persist in the C finest levels. In the C finest levels, bubbles have a significant influence on the resulting pressure values. On the other hand, letting air bubbles disappear in coarser levels is not problematic because only a general pressure profile is needed in the coarser levels in order to get accurate pressure values in the original grid. Tracking bubbles on coarser levels is not only unnecessary but keeping bubbles at the coarser levels yields incorrect profiles because the influence of the bubbles at the coarser levels becomes exaggerated. In one embodiment, C=2 is used for simulations.

The coefficients of the $A^l$ matrix are then computed for each level using Equation (16). Unlike conventional solvers, sub-grid features are handled correctly through the ghost fluid and solid fraction methods on all the levels of the hierarchy. So in contrast to conventional solvers, the solver converges even in the presence of irregular free-surface and solid boundaries. Handling sub-grid features correctly is crucial to obtain meaningful pressures fields on coarse levels. For example, in the hydrostatic case free surface boundary conditions are enforced at the correct location up to first order to get a correct linear pressure profile on all levels of the hierarchy. Without using sub-grid resolution, slightly different problems would be solved on the coarse grids.

For smoothing, the Red-Black Gauss-Seidel (RBGS) method may be used and the system may be solved in two parallel passes. The restriction operator tri-linearly interpolates r, where $r_{(x,y,z)}$ is specially computed as $$r_{(x,y,z)} = \begin{cases} r_{x,1,z} & \text{if } y = H_{x,z} + 1 \\ r_{x,2,z} & \text{if } y = H_{x,z} + h_{x,z} \\ r_{x,y} - H_{x,z} - h_{x,z} - 2, z & \text{if } H_{x,z} + h_{x,z} \le y < H_{x,z} + h_{x,z} + B_y \\ 0 & \text{otherwise} \end{cases} \quad \text{(equation 19)}$$

Note that r(x,y,z) is zero everywhere inside a tall cell except at the top and bottom, because divergence is measured only at the top and bottom sub-cells. Using a wider stencil for restriction as is used in some conventional techniques is more expensive and may not yield a faster convergence rate. For prolongation tri-linear interpolation is used. On the boundary, if a pressure value outside the grid is needed for interpolation, then the value is ignored and the interpolation weights are renormalized. If all values are outside the grid, the pressure is set to zero.

There are three critical steps to making the multigrid algorithm converge:
1. The use of full-cycles.
2. Preserving air bubbles in the finest levels.
3. Using the ghost fluid and solid fraction methods.

Not considering any one of the critical steps leads to either stagnation or even divergence of the solver.

TABLE 3 summarizes the algorithm for the V_Cycle function shown in line 12 of TABLE 2.

TABLE 3

V_Cycle function

```
1: if l ==1 then
2:     Solve the linear system, A¹p¹ = b¹
3: else
4:     for i=1 to num_Pre_Sweep do
5:         Smooth(pˡ)
6:     end for
7:     rˡ = bˡ−Apˡ
8:     bˡ⁻¹ = Restrict(rˡ)
9:     pˡ⁻¹ = 0
10:    V_Cycle(l−1)
11:    pˡ = pˡ + Prolong(pˡ⁻¹)
12:    for i=1 to num_Post_Sweep do
13:        Smooth(pˡ)
14:    end for
15: end if
```

TABLE 4 summarizes the algorithm for the Full_Cycle function shown in line 9 of TABLE 2.

TABLE 4

Full_Cycle function

```
1: pᵗᵐᵖ = pᴸ
2: rᴸ = bᴸ − Aᴸpᴸ
3: for l=L − 1 down to 1 do
4:     rˡ = Restrict(rˡ⁺¹)
5: end for
6: b¹ = r¹
7: Solve the linear system, A¹p¹ = b¹
8: for l=2 to L do
9:     pˡ = Prolong(pˡ⁻¹)
10:    bˡ = rˡ
11:    V_Cycle(l)
12: end for
13: pᴸ = pᵗᵐᵖ + pᴸ
```

Several optimizations may be employed to increase performance during simulation.

For all tri-linear interpolations, first interpolate along the y-axis. This step always requires exactly 2 consecutive grid point values independent of whether the entry is part of a tall or a regular cell. In this way, only 8 memory accesses are necessary instead of up to 16 when using equation 5 naively.

In the Gauss Seidel step, to get the pressure below the top pressure value of a tall cell, access $p_{i,j-1,k}$ in the compressed grid and do the interpolation implicitly via modifying the Laplace stencil instead of querying $p_{(i,y-1,k)}$ through the mapping function.

The grid hierarchy is clamped at the level that completely fits in the GPU's shared memory. The level of the grid hierarchy can then be solved efficiently to high precision by executing multiple Gauss Seidel iterations using a single kernel.

The hierarchical grid is only built once per simulation frame at the incompressibility solve step. The same hierarchy can be re-used for velocity extrapolation in the next time step because remeshing happens after velocity extrapolation.

Figure 6A:
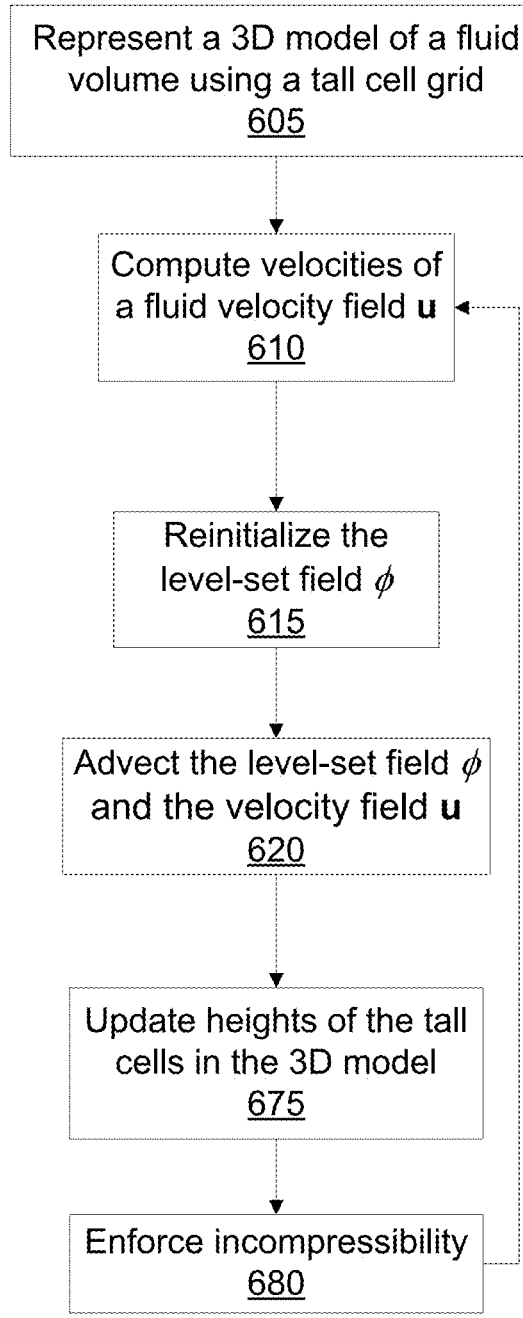
FIG. 6A is a flow diagram illustrating a technique for performing a simulation using a tall cell grid model, according to one embodiment of the present invention.

FIG. 6A is a flow diagram illustrating a technique for performing a simulation using a tall cell grid model, according to one embodiment of the present invention. Although the method steps are described in conjunction with the systems of FIGS. 1, 2, 3A, 3B, 3C, and 4 persons skilled in the art will understand that any system configured to perform the method steps, in any order, is within the scope of the inventions.

The steps shown in FIG. 6A are performed by a processor, e.g., CPU or GPU, for one or more timesteps to complete a simulation of a 3D model of a fluid volume. At step 605 a 3D model of the fluid volume is represented using a tall cell grid. In one embodiment, a 3D model of water is represented as a two-dimensional grid of a plurality of columns that each comprise a single tall cell and a constant number of regular cubic cells. At step 610 velocities of a fluid velocity field u are extrapolated into the air region of the 3D model of the fluid volume using equation 7. At step 615 the level-set field φ is reinitialized. At step 620 the level-set field φ and the velocity field u are advected, taking external forces into account. At step 675 the heights of the tall cells in the 3D model are updated based on the velocity field, i.e., remeshing is performed using equation 10. At step 680 incompressibility is enforced by making the velocity field divergence free using equations 16, 17, and 18. Steps 610 through 680 are repeated for each timestep of the simulation.

Figure 6B:
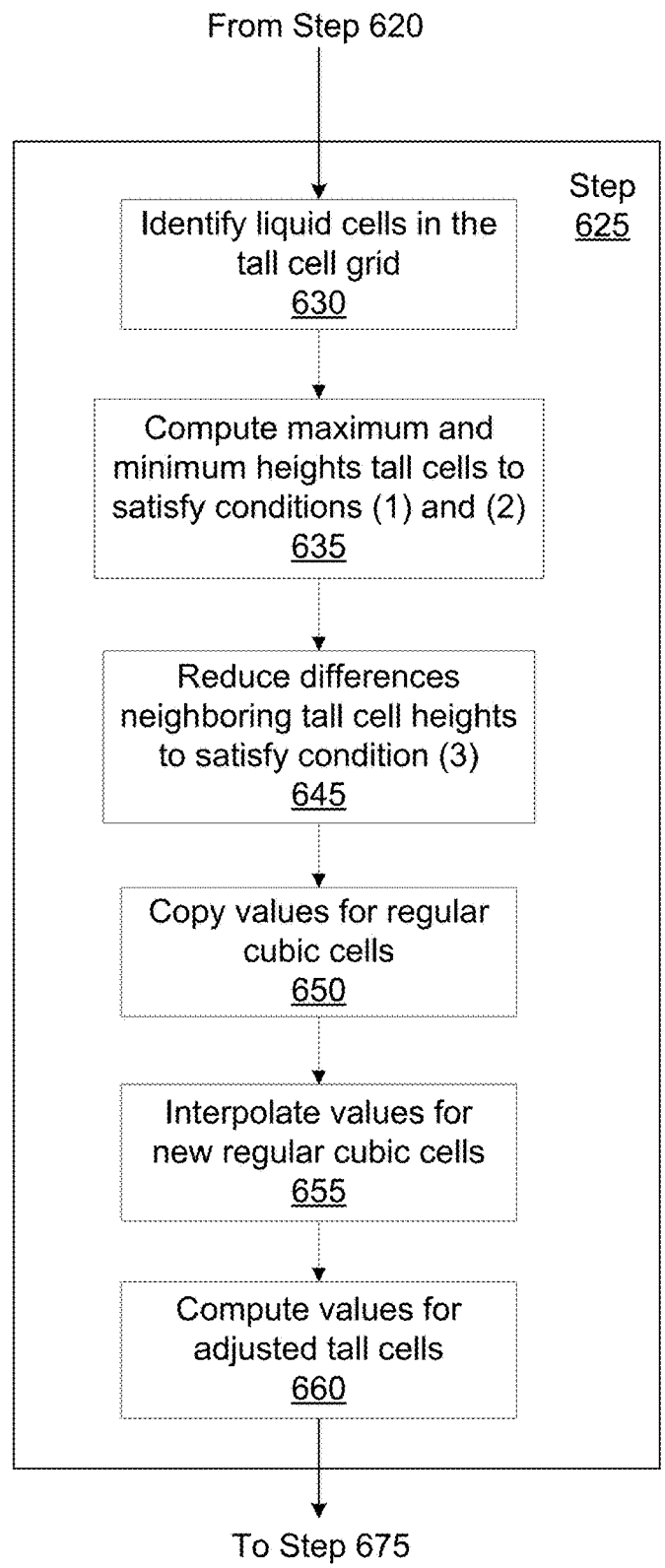
FIG. 6B is a flow diagram illustrating a step shown in FIG. 6A, according to one embodiment of the present invention.

FIG. 6B is a flow diagram illustrating step 625 of FIG. 6A, according to one embodiment of the present invention. Although the method steps are described in conjunction with the systems of FIGS. 1, 2, 3A, 3B, 3C, and 4 persons skilled in the art will understand that any system configured to perform the method steps, in any order, is within the scope of the inventions.

At step 630 single tall cells and regular cubic cells residing within a surface of the water are identified as liquid cells. At step 635 maximum and minimum heights of the tall cells are computed for each column in the tall cell grid to satisfy constraints (1) maintaining a minimum number of regular cubic cells below a surface of the water. and (2) maintaining a minimum number of regular cubic cells above the surface of the water. At step 645 differences between directly adjacent neighboring tall cell heights computed at step 635 are reduced to satisfy constraint (3) the heights of adjacent tall cells must not differ by more than D units. At step 650 values are copied from the previous timestep for regular cubic cells that have not been absorbed into the single tall cells. At step 655 values are interpolated using the values of tall cells for new regular cubic cells. At step 660 values are computed for tall cells having heights that have changed compared with the previous timestep.

Figure 7:
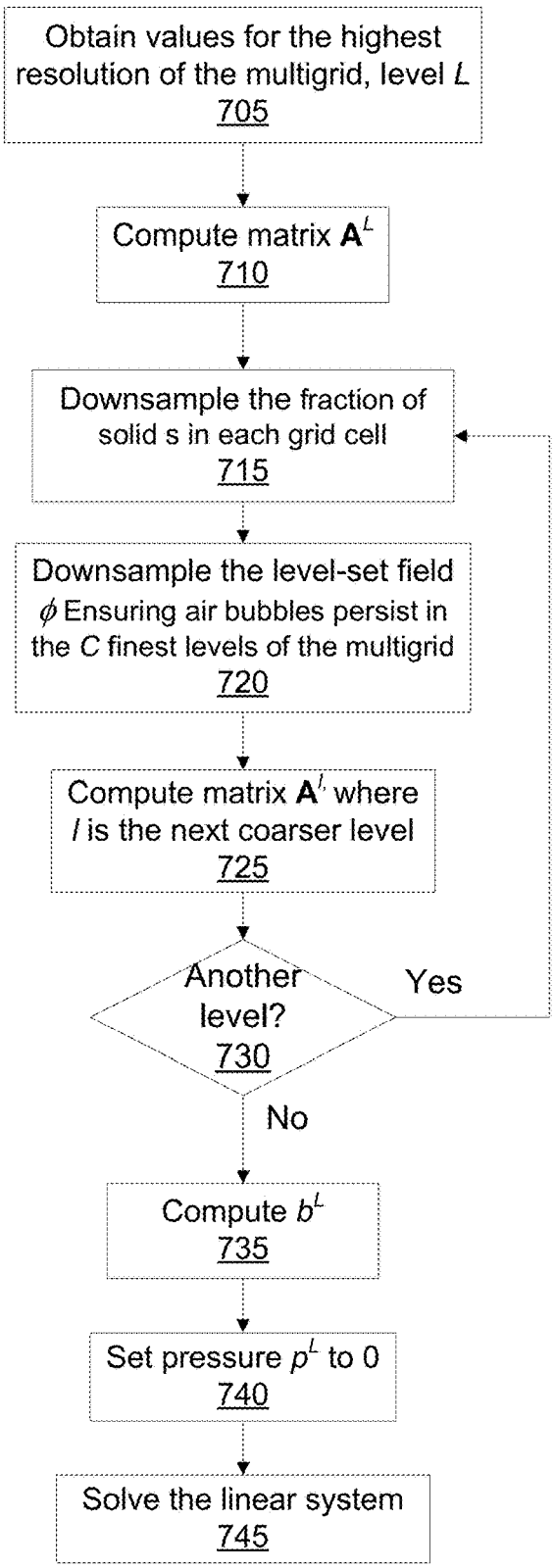
FIG. 7 is a flow diagram illustrating a technique for constructing a multigrid and implementing a multigrid pressure solver for a fluid simulation, according to one embodiment of the present invention.

FIG. 7 is a flow diagram illustrating a technique for constructing a multigrid and implementing a multigrid pressure solver for a fluid simulation, according to one embodiment of the present invention. Although the method steps are described in conjunction with the systems of FIGS. 1, 2, 3A, 3B, 3C, and 4 persons skilled in the art will understand that any system configured to perform the method steps, in any order, is within the scope of the inventions.

At step 705 a first level-set field values (φ) and first solid fraction values (s) for a three-dimensional model of a fluid volume represented as a first two-dimensional grid of columns is obtained. Each column within the first two-dimensional grid includes one or more regular cubic cells. When a tall cell grid is used, each column within the first two-dimensional grid includes a single tall cell and may include one or more regular cubic cells. The first two-dimensional grid is the highest resolution of the multigrid, level L.

At step 710, coefficients of the matrix $A^L$ are computed using equation (16). At step 715 the first solid fraction values are downsampled to generate second solid fraction values for the second two-dimensional grid of columns. At step 720, the first level-set field values are downsampled to generate second level-set field values for a second two-dimensional grid of columns that represents the three-dimensional model of the fluid volume and is coarser than the first two-dimensional grid of columns.

When $C \geq 1$, the downsampling increases the likelihood that air bubbles will persist in the second two-dimensional grid of columns. As previously described, different downsampling computations are used based on C and whether the level-set field values to be downsampled to produce a single value for a coarser level of the multigrid have the same sign. When all of the level-set field values to be downsampled have the same sign, a level-set field value for the second two-dimensional grid of columns is computed as an average of a sub-set of the first level-set field values for the first two-dimensional grid of columns. When the level of the multigrid to be generated, l is less than L-C, a level-set field value for the second two-dimensional grid of columns is also computed as an average of a sub-set of the first level-set field values for the first two-dimensional grid of columns. When l is not less than L-C or all of the level-set field values to be downsampled do not have the same sign, the second two-dimensional grid of columns is computed as an average of portion of a sub-set of the second level-set field values having positive signs.

At step 725, coefficients of the matrix $A^l$ are computed using equation (16), where l is the next coarser level of the multigrid, e.g., l=L-1, l=L-2 . . . to l=0. At step 730, the multigrid generator determines if another level of the multigrid can be generated, i.e., if l>0. If another level can be generated, then the multigrid generator returns to step 715. Otherwise, at step 735, the multigrid generator has completed generating the multigrid and the multigrid pressure solver computes $b^L$. At step 740 the multigrid pressure solver sets the pressure $p^L$ to zero. At step 745 the multigrid pressure solver solves a linear system in the form Ap=b, where A is a matrix and p is pressure for the different levels of the multigrid. The multigrid pressure solver assigns negative pressure to regular cubic cells that represent air such that p=0 on a surface between air and liquid represented by the first two-dimensional grid of columns, the second two-dimensional grid of columns, and coarser levels of the multigrid. The multigrid pressure solver algorithm is described in TABLEs 3 and 4.

In sum, a three-dimensional model of water is represented as a two-dimensional grid of water columns. A multigrid is generated by downsampling a highest resolution of the grid of water columns to produce successively coarser versions of the water model. A multigrid pressure solver is used to efficiently solve the Poisson equation computing accurate pressure values during simulations. The computational density is focused near the surface of the water to ensure accurate simulation results where the motion of the water is most interesting. The downsampling technique ensures that air bubbles persist in the higher resolution grids of the multigrid. Finally, a correct linear pressure profile is maintained for the multigrid and a pressure solver that using the multigrid converges even in the presence of irregular free-surface and solid boundaries.

One advantage of the technique is that free surface water simulations may be performed in real-time and also produce detailed water movement. A model of the water to be simulated is represented using a cell grid. The multigrid provides a hierarchy of increasingly coarser representations of the model that are used by a pressure solver. Eulerian simulation techniques require solving a linear system to determine pressure values for each cell within the cell grid. Different levels of the multigrid are used to compute the pressure values for different regions of the model, maintaining accuracy while simplifying the computations. The multigrid ensures that air bubbles are correctly modeled near the surface of the water. The accurate pressure values ensure that the water movement is comparable in terms of visual detail to that provided by full three-dimensional model simulation performed off-line. Therefore, visually interesting water simulations may be performed in real-time enabling user interaction for game applications.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for simulating water, comprising:

representing a three-dimensional model of a fluid volume as a two-dimensional grid of columns, wherein each column within the two-dimensional grid includes a single tall cell and one or more regular cubic cells, wherein each column comprises a constant number of the regular cubic cells;

computing, via a processor, one or more velocities of a fluid velocity field;

for each single tall cell included in the two-dimensional grid of columns, storing, in the single tall cell, only one velocity component of the one or more computed velocities for each neighboring tall cell directly adjacent to the single tall cell in order to maintain a constant data size for the one or more computed velocities; and for each column in the two-dimensional grid of columns, updating a height of the single tall cell associated with the column based on one or more velocities stored in the single tall cell.

2. The computer-implemented method of claim 1, wherein, for each column in the two-dimensional grid, updating the height of the single tall cell associated with the column comprises:
  identifying one or more single tall cells and a plurality of regular cubic cells residing within the fluid volume as liquid cells; and
  determining a number of the liquid cells to group into the single tall cell.

3. The computer-implemented method of claim 2, wherein determining the number of the liquid cells comprises limiting differences in height between directly adjacent neighboring single tall cells.

4. The computer-implemented method of claim 2, wherein determining the number of the liquid cells comprises maintaining a minimum number of regular cubic cells in an air region above a surface of the liquid cells.

5. The computer-implemented method of claim 2, wherein determining the number of the liquid cells comprises maintaining a minimum number of regular cubic cells below a surface of the liquid cells.

6. The computer-implemented method of claim 1, wherein only two velocities are stored for the single tall cell associated with the column, a first velocity at a top of the single tall cell and a second velocity at a bottom of the single tall cell.

7. The computer-implemented method of claim 6, wherein updating the height of the single tall associated with the column comprises interpolating the first velocity and the second velocity to compute a third velocity corresponding to a first regular cubic cell that replaces a portion of the single tall cell.

8. The computer-implemented method of claim 6, wherein updating the height of the single tall cell associated with the column comprises computing a least square fit of a velocity of a first regular cubic cell to compute the first velocity and the second velocity of the single tall cell that replaces at least the first regular cubic cell.

9. The computer-implemented method of claim 1, wherein computing one or more velocities of the fluid velocity field comprises extrapolating the fluid velocity field into an air region of the fluid volume that is represented by at least a portion of the regular cubic cells.

10. The computer-implemented method of claim 1, wherein a tall cell structure for all tall cells is represented with a three-dimensional array of values, wherein the three-dimensional array has a size, $(B_x, B_y+2, B_z)$, where $B_x$ and $B_z$ are numbers of regular cubic cells along the x-axis and the z-axis, respectively, and $B_y$ is the constant number of the regular cubic cells per column.

11. The computer-implemented method of claim 1, further comprising:
  downsampling a highest resolution of the two-dimensional grid of columns to produce successively coarser versions of the three-dimensional model; and
  utilizing a multigrid pressure solver to compute pressure values.

12. The computer-implemented method of claim 1, wherein the two-dimensional grid of columns is included in a multi-grid structure comprising a plurality of two-dimensional grids of columns, and wherein each two-dimensional grid of columns included in the multi-grid structure is associated with a different coarseness level, and further comprising computing pressure values for different regions of the three-dimensional model of the fluid volume based on the different coarseness levels associated with the two-dimensional grids of columns included in the multi grid structure.

13. A non-transitory computer-readable storage medium storing instructions that, when executed by a processor, cause the processor to perform water simulation by performing the steps of:
  representing a three-dimensional model of a fluid volume as a two-dimensional grid of columns, wherein each column within the two-dimensional grid includes a single tall cell and one or more regular cubic cells, wherein each column comprises a constant number of the regular cubic cells;
  computing, via a processor, one or more velocities of a fluid velocity field;
  for each single tall cell included in the two-dimensional grid of columns, storing, in the single tall cell, only one velocity component of the one or more computed velocities for each neighboring tall cell directly adjacent to the single tall cell in order to maintain a constant data size for the one or more computed velocities; and
  for each column in the two-dimensional grid of columns, updating a height of the single tall cell associated with the column based on one or more velocities stored in the single tall cell.

14. The non-transitory computer-readable storage medium of claim 13, wherein, for each column in the two-dimensional grid, updating the height of the single tall cell associated with the column comprises:
  identifying one or more single tall cells and a plurality of regular cubic cells residing within the fluid volume as liquid cells; and
  determining a number of the liquid cells to group into the single tall cell.

15. The non-transitory computer-readable storage medium of claim 14, wherein determining the number of the liquid cells comprises limiting differences in height between directly adjacent neighboring single tall cells.

16. The non-transitory computer-readable storage medium of claim 14, wherein determining the number of the liquid cells comprises maintaining a minimum number of regular cubic cells in an air region above a surface of the liquid cells.

17. The non-transitory computer-readable storage medium of claim 14, wherein determining the number of the liquid cells comprises maintaining a minimum number of regular cubic cells below a surface of the liquid cells.

18. The non-transitory computer-readable storage medium of claim 13, wherein only two velocities are stored for the single tall cell associated with the column, a first velocity at a top of the single tall cell and a second velocity at a bottom of the single tall cell.

19. The non-transitory computer-readable storage medium of claim 18, wherein updating the height of the single tall associated with the column comprises interpolating the first velocity and the second velocity to compute a third velocity corresponding to a first regular cubic cell that replaces a portion of the single tall cell.

20. The non-transitory computer-readable storage medium of claim 18, wherein updating the height of the single tall cell associated with the column comprises computing a least square fit of a velocity of a first regular cubic cell to compute the first velocity and the second velocity of the single tall cell that replaces at least the first regular cubic cell.

21. A system for simulating water, the system comprising:
a processor; and
a memory coupled to the processor, wherein the memory includes:
  a program including instructions that, when executed by the processor, cause the processor to:
    represent a three-dimensional model of a fluid volume as a two-dimensional grid of columns, wherein each column within the two-dimensional grid includes a single tall cell and one or more regular cubic cells, wherein each column comprises a constant number of the regular cubic cells;
    compute, via a processor, one or more velocities of a fluid velocity field;
    for each single tall cell included in the two-dimensional grid of columns, store, in the single tall cell, only one velocity component of the one or more computed velocities for each neighboring tall cell directly adjacent to the single tall cell in order to maintain a constant data size for the one or more computed velocities; and
    for each column in the two-dimensional grid of columns, update a height of the single tall cell associated with the column based on one or more velocities stored in the single tall cell.

* * * * *